(12) United States Patent
Shibata et al.

(10) Patent No.: US 11,264,000 B2
(45) Date of Patent: *Mar. 1, 2022

(54) DISPLAY CONTROL DEVICE AND NON-TRANSITORY COMPUTER READABLE MEDIUM

(71) Applicant: DENSO CORPORATION, Kariya (JP)

(72) Inventors: Shunsuke Shibata, Nisshin (JP); Masayuki Imanishi, Nisshin (JP); Norio Samma, Nisshin (JP); Takeshi Hato, Kariya (JP); Takeshi Kawashima, Kariya (JP); Sei Iguchi, Kariya (JP); Hiroto Banno, Kariya (JP); Daisuke Takemori, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,974

(22) Filed: May 6, 2020

(65) Prior Publication Data

US 2020/0273435 A1 Aug. 27, 2020

Related U.S. Application Data (63) Continuation of application No. PCT/JP2018/035273, filed on Sep. 25, 2018.

(30) Foreign Application Priority Data

Nov. 10, 2017 (JP) .............................. JP2017-217468

(51) Int. Cl.
*G09G 5/38* (2006.01)
*G06T 15/20* (2011.01)
(Continued)

(52) U.S. Cl.
CPC ............... *G09G 5/38* (2013.01); *B60K 35/00* (2013.01); *G02B 27/0179* (2013.01);
(Continued)

(58) Field of Classification Search
CPC .............................. G06T 15/20; G06T 19/006
See application file for complete search history.

(56) References Cited

U.S. PATENT DOCUMENTS

2006/0228097 A1* 10/2006 Higurashi ................ G03B 5/00
396/55
2010/0164702 A1* 7/2010 Sasaki .................... G01B 21/22
340/438
(Continued)

FOREIGN PATENT DOCUMENTS

EP 0803401 A2 10/1997
EP 2543541 A1 1/2013
(Continued)

OTHER PUBLICATIONS

U.S. Appl. No. 16/868,192, filed May 6, 2020, Shunsuke Shibata et al.

*Primary Examiner* — Yi Yang
(74) *Attorney, Agent, or Firm* — Harness, Dickey & Pierce, P.L.C.

(57) ABSTRACT

A display control device controls display of a virtual image which is superimposed on foreground of a vehicle by projection of a display light image from an optical unit to a projection area. The display control device sets a projection position of the display light image which is projected in the projection area on the basis of a relative position of a superimposition object on which the virtual image is superimposed, obtains a measurement information from one vehicle height sensor measuring a displacement in a vertical direction occurring in the vehicle, obtains a gradient information indicating a gradient of a road on which the vehicle (Continued)

travels on the basis of three-dimensional map data, and corrects the projection position of the display light image on the basis of the measurement information and the gradient information.

8 Claims, 7 Drawing Sheets

(51) Int. Cl.
   *B60K 35/00* (2006.01)
   *G02B 27/01* (2006.01)
   *G06T 11/00* (2006.01)

(52) U.S. Cl.
   CPC ...... *G06T 11/00* (2013.01); *B60K 2370/1529* (2019.05); *B60K 2370/166* (2019.05); *B60K 2370/167* (2019.05); *B60K 2370/31* (2019.05); *B60K 2370/52* (2019.05); *G02B 2027/0183* (2013.01); *G06T 2200/24* (2013.01); *G09G 2354/00* (2013.01); *G09G 2380/10* (2013.01)

(56) References Cited

U.S. PATENT DOCUMENTS

| | | | | |
|---|---|---|---|---|
| 2012/0050138 | A1* | 3/2012 | Sato | G02B 27/017 345/4 |
| 2015/0039201 | A1* | 2/2015 | Dean | B60K 23/04 701/88 |
| 2015/0070158 | A1* | 3/2015 | Hayasaka | G01S 7/04 340/438 |

FOREIGN PATENT DOCUMENTS

| | | |
|---|---|---|
| JP | H08093828 A | 4/1996 |
| JP | H09223227 A | 8/1997 |
| JP | H09-286274 A | 11/1997 |
| JP | 2009040140 A | 2/2009 |
| JP | 2010156608 A | 7/2010 |
| JP | 2010256878 A | 11/2010 |
| JP | 2011117842 A | 6/2011 |
| JP | 2013014231 A | 1/2013 |
| JP | 2015048040 A | 3/2015 |
| JP | 2019020393 A | 2/2019 |

* cited by examiner

<FLAT ROAD>

FIG. 4

<SLOPING ROAD>

FIG. 5

ROAD GRADIENT $\Theta h \neq$ VEHICLE GRADIENT $\phi a$

FIG. 6

$$\Theta h = \tan^{-1} \frac{Z_2 - Z_1}{\sqrt{(X_2 - X_1)^2 + (Y_2 - Y_1)^2}}$$

<AT THE TIME OF ACCELERATION>

DISPLAY CONTROL DEVICE AND NON-TRANSITORY COMPUTER READABLE MEDIUM

CROSS REFERENCE TO RELATED APPLICATIONS

The present application is a continuation application of International Patent Application No. PCT/JP2018/035273 filed on Sep. 25, 2018, which designated the U.S. and claims the benefit of priority from Japanese Patent Application No. 2017-217468 filed on Nov. 10, 2017. The entire disclosures of all of the above applications are incorporated herein by reference.

TECHNICAL FIELD

The present disclosure relates to a display control device and a non-transitory computer readable medium for controlling display of a virtual image superimposed on foreground of a vehicle.

BACKGROUND

For example, an information display device displays a virtual image in a superimposed manner by projection of a video image to the windshield of a vehicle. Such an information display device obtains behavior information of a vehicle including a pitch rotation amount by using a gyroscope, a G sensor, a yaw rate sensor, and the like. In addition, the information display device obtains map data including a tilt angle of a road on which a vehicle travels from a map database.

SUMMARY

The present disclosure describes a display control device for controlling display of a virtual image which is superimposed on foreground of a vehicle by projection of a display light image from an optical unit to a projection area. The display control device sets a projection position of the display light image, which is projected in the projection area on the basis of a relative position of a superimposition object on which the virtual image is superimposed, obtains a measurement information from one vehicle height sensor measuring a displacement in a vertical direction occurring in the vehicle, obtains gradient information indicating a gradient of a road on which the vehicle travels on the basis of three-dimensional map data, and corrects the projection position of the display light image on the basis of the measurement information and the gradient information.

BRIEF DESCRIPTION OF DRAWINGS

Features and advantages of the present disclosure will become more apparent from the following detailed description made with reference to the accompanying drawings.

DETAILED DESCRIPTION

An information display device, which displays a virtual image in a superimposed manner by projection of a video image to the windshield of a vehicle, may correct a display position of the virtual image on the basis of a behavior information of the vehicle and a map data. In order to grasp a vehicle orientation, it is a precondition that a gyroscope, a G sensor, a yaw rate sensor and the like are mounted in a vehicle. For example, although a G sensor and a yaw rate sensor detecting a vehicle behavior in a specific direction have been used, it is difficult to say that a vehicle having all of those sensors is common. Consequently, addition of a plurality of detection components or a special detection component detecting a vehicle orientation may be necessary to correct the display position of the virtual image.

The present disclosure provides a display control device capable of reducing a deviation of virtual image display while avoiding complication of a configuration for detecting a vehicle orientation.

According to an aspect of the present disclosure, a display control device is for controlling display of a virtual image which is superimposed on foreground of a vehicle by projection of a display light image from an optical unit to a projection area. The display control device includes: a position setting unit setting a projection position of the display light image which is projected in the projection area on the basis of a relative position of a superimposition object on which the virtual image is superimposed; a measurement information obtaining unit obtaining measurement information from one vehicle height sensor measuring a displacement in a vertical direction occurring in the vehicle; and a gradient information obtaining unit obtaining gradient information indicating a gradient of a road on which the vehicle travels on the basis of three-dimensional map data. The position setting unit corrects the projection position of the display light image on the basis of the measurement information and the gradient information.

The present disclosure also provides a non-transitory computer readable medium storing a computer program product comprising instructions for controlling display of a virtual image which is superimposed on foreground of a vehicle by projection of a display light image from an optical unit to a projection area. According to an aspect, the instructions being configured to, when executed by a processor, cause the processor to: set a projection position of the display light image which is projected in the projection area on the basis of a relative position of a superimposition object on which the virtual image is superimposed; obtain measurement information from one vehicle height sensor measuring a displacement in a vertical direction occurring in the vehicle; obtain gradient information indicating a gradient of a road on which the vehicle travels on the basis of three-dimensional map data; and corrects the projection position of the display light image on the basis of the measurement information and the gradient information.

In the display control device and the non-transitory computer readable medium according to the above aspect, the projection position of the display light image is corrected by gradient information based on three-dimensional map data and measurement information measured by a single vehicle height measurement sensor. Consequently, a plurality of sensors or complicated configuration for measuring the orientation of a vehicle may not be required. Therefore, while avoiding complication of the configuration of detecting the vehicle orientation, a deviation of virtual image display from a superimposition object can be decreased.

An embodiment of the present disclosure will be described with reference to the drawings.

Figure 1:
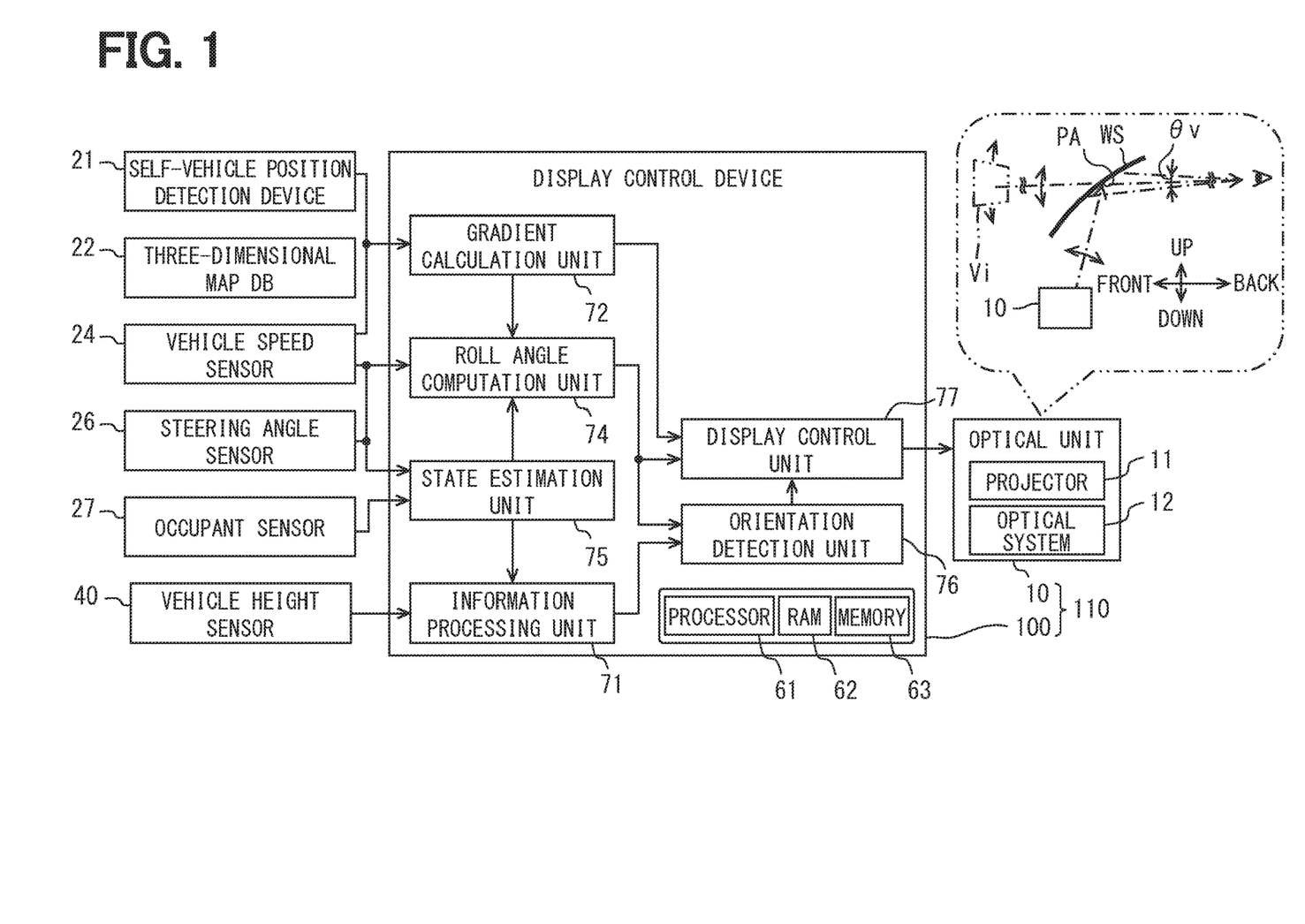
FIG. 1 is a block diagram illustrating a whole image of an in-vehicle system including a display control device according to an embodiment of the present disclosure.

A display control device 100 according to an embodiment of the present disclosure illustrated in FIG. 1 is applied to a virtual image display system 110 used in a vehicle. The virtual image display system 110 presents various information related to a vehicle to the driver by using a virtual image Vi superimposed on the foreground of the vehicle. The virtual image display system 110 is configured by combining an optical unit 10, the display control device 100, and the like.

The optical unit 10 is one of a plurality of displays mounted in the vehicle and electrically connected to the display control device 100. The optical unit 10 projects light of a display light image in a projection area PA designated in a windshield WS of the vehicle and displays the virtual image Vi of the display light image so that it can be visually recognized by an occupant (for example, the driver) of the vehicle. The optical unit 10 has a projector 11 and a reflective optical system 12 as components for displaying the virtual image Vi.

The projector 11 projects light of a display light image formed as the virtual image Vi toward the reflective optical system 12. The reflective optical system 12 projects the light of the display light image incident from the projector 11 to the projection area PA. The light projected to the windshield WS is reflected by the projection area PA toward an eye point side and perceived by the driver. Alternatively, the projection area PA may be designated in a projection member such as a combiner provided separately from the windshield WS.

The display control device 100 is an electronic control unit controlling display by the display mounted in the vehicle. The display control device 100 has a function of detecting the orientation of the vehicle as one of functions for controlling virtual image display by the optical unit 10. As will be described later, the display control device 100 controls so as to correct the projection position and the projection shape of a display light image in accordance with an orientation change of the vehicle and form the virtual image Vi of a proper shape in a proper position in the foreground (refer to FIG. 4). The display control device 100 is electrically connected directly or indirectly to a self-vehicle position detection device 21, a three-dimensional map database 22, a vehicle speed sensor 24, a steering angle sensor 26, an occupant sensor 27, a vehicle height sensor 40, and the like to obtain information necessary to detect the vehicle orientation.

The self-vehicle position detection device 21 receives positioning signals from a plurality of satellites. The self-vehicle position detection device 21 can receive positioning signals from positioning satellites of at least one satellite positioning system from satellite positioning systems such as GPS, GLONASS, Galileo, IRNSS, QZSS, and Beidou. The self-vehicle position detection device 21 measures the position of the self-vehicle, on which the display control device 100 is mounted, on the basis of the received positioning signals. The self-vehicle position detection device 21 sequentially outputs the measured vehicle position information toward the display control device 100.

The three-dimensional map database (hereinbelow, "three-dimensional map DB") 22 is configured mainly by a large-capacity storage medium storing a number of pieces of three-dimensional map data and two-dimensional map data. The three-dimensional map data is high-precision map data which enables automatic driving of a vehicle. In the three-dimensional map data, a landform and a structure are expressed by a point group having three-dimensional coordinate information. The three-dimensional map DB 22 can update three-dimensional map data to latest information through a network. The three-dimensional map DB 22 can provide three-dimensional map data around and in the travel direction of a vehicle to the display control device 100 in accordance with a request from the display control device 100. In the case where three-dimensional map data in an area requested to be provided is not ready, the three-dimensional map DB 22 provides usual two-dimensional map data used for navigation or the like to the display control device 100.

The vehicle speed sensor 24 and the steering angle sensor 26 are state sensors detecting the state of the vehicle. The vehicle speed sensor 24 detects, for example, the rotational speed of wheels of the vehicle. The vehicle speed sensor 24 sequentially outputs a signal indicating the rotational speed of wheels toward the display control device 100. The steering angle sensor 26 detects, for example, the rotation direction and the rotation angle of a steering shaft. The reference of the rotational angle is an angle phase (0°) at the time of direct advance. The steering angle sensor 26 sequentially outputs signals indicating the rotation direction and the rotation angle (steering angle) from the reference position toward the display control device 100.

The occupant sensor 27 is a sensor for measuring the number of occupants in the vehicle. The occupant sensor 27 is disposed in each of the seating faces of the driver's seat, the front passenger seat, and the rear passenger seats. The occupant sensor 27 is, for example, a switch which is turned on/off by application of a load and detects seating of an occupant on each of the seating faces. A detection result by the occupant sensor 27 is information indicating a seat on which an occupant sits in the vehicle and is sequentially obtained by the display control device 100.

Figure 2:
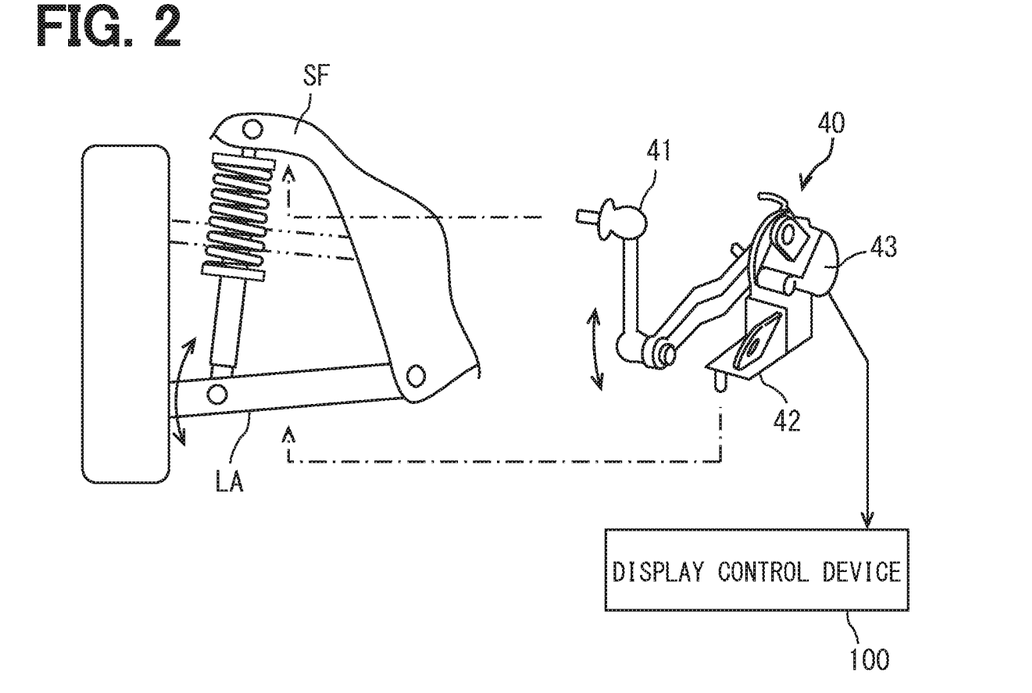
FIG. 2 is a perspective view illustrating an example of a vehicle height sensor.

The vehicle height sensor 40 illustrated in FIG. 2 is a sensor detecting a displacement in the vertical directions which occurs in the vehicle to measure the height of the body from the road surface on which the vehicle stands. The vehicle height sensor 40 measures a sinking amount with respect to the body, of a specific wheel which displaces in the vertical direction by the operation of a suspension arm suspended by the body. Concretely, the vehicle height sensor 40 obtains a relative distance between the body and the suspension arm as measurement information and sequentially outputs it toward the display control device 100. Only one vehicle height sensor 40 is attached in a place rearward from the center in the front-rear direction of the vehicle and measures a displacement in the vertical directions in the rear part of the vehicle. In the case of a right-hand-drive vehicle, the vehicle height sensor 40 is attached to the left-rear suspension. In the case of a left-hand-drive vehicle, the vehicle height sensor 40 is attached to the right-rear suspension. The vertical direction is the vertical direction which is along the direction of gravity.

The vehicle height sensor 40 has a first coupling part 41, a second coupling part 42, and a measuring unit 43. The first coupling part 41 can turn relative to the second coupling part 42. The first coupling part 41 is coupled to one of the body and the suspension arm (for example, the body). As an example, the first coupling part 41 is attached to a sub frame SF of the body.

The second coupling part 42 is coupled to the other of the body and the suspension arm, which is not coupled to the first coupling part 41 (for example, the suspension). The second coupling part 42 is attached to, for example, a lower arm LA of a plurality of supporting elements supporting the wheel in a suspension device.

The measuring unit 43 measures a displacement amount in the vertical direction of the lower arm LA with respect to the sub frame SF. Specifically, in accordance with a swing of the lower arm LA, the first coupling part 41 turns relative to the second coupling part 42. The measuring unit 43 measures a relative turn amount of the first coupling part 41 as a displacement amount in the vertical direction of the lower arm LA. The measuring unit 43 has, as an example, a magnet and a hall device and detects a change in a magnetic flux accompanying turn of the first coupling part 41 by the hall device. The measuring unit 43 may measure the relative turn amount of the first coupling part 41 by a configuration in which a light emission diode and a photo transistor are combined. The vehicle height sensor 40 sequentially provides an output value of the measuring unit 43 as measurement information to the display control device 100.

As illustrated in FIG. 1, the display control device 100 is an electronic control unit configured mainly by a computer having a processor 61, a RAM 62, a memory device 63, and an input/output interface. The processor 61 has a configuration including at least one of a CPU (Central Processing Unit), a GPU (Graphics Processing Unit), and an FPGA (Field-Programmable Gate Array). The processor 61 may include a dedicated processor specialized in learning of AI (Artificial Intelligence) and inference.

Figure 3:
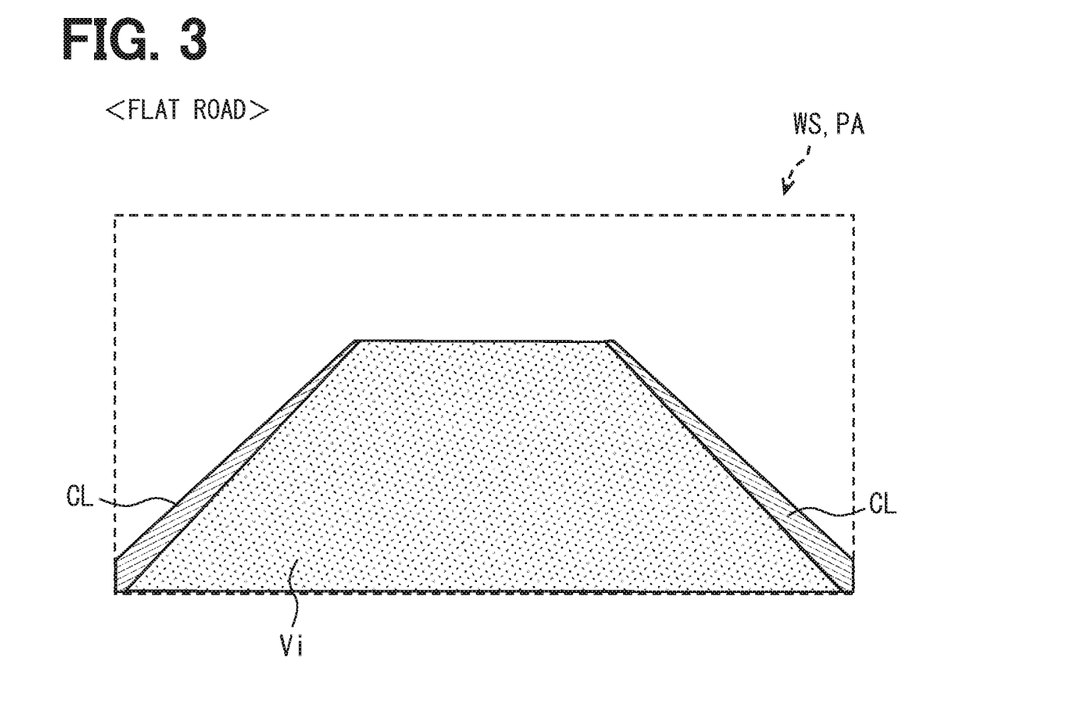
FIG. 3 is a diagram illustrating an example of AR display visually recognized by the driver on a flat road.
Figure 4:
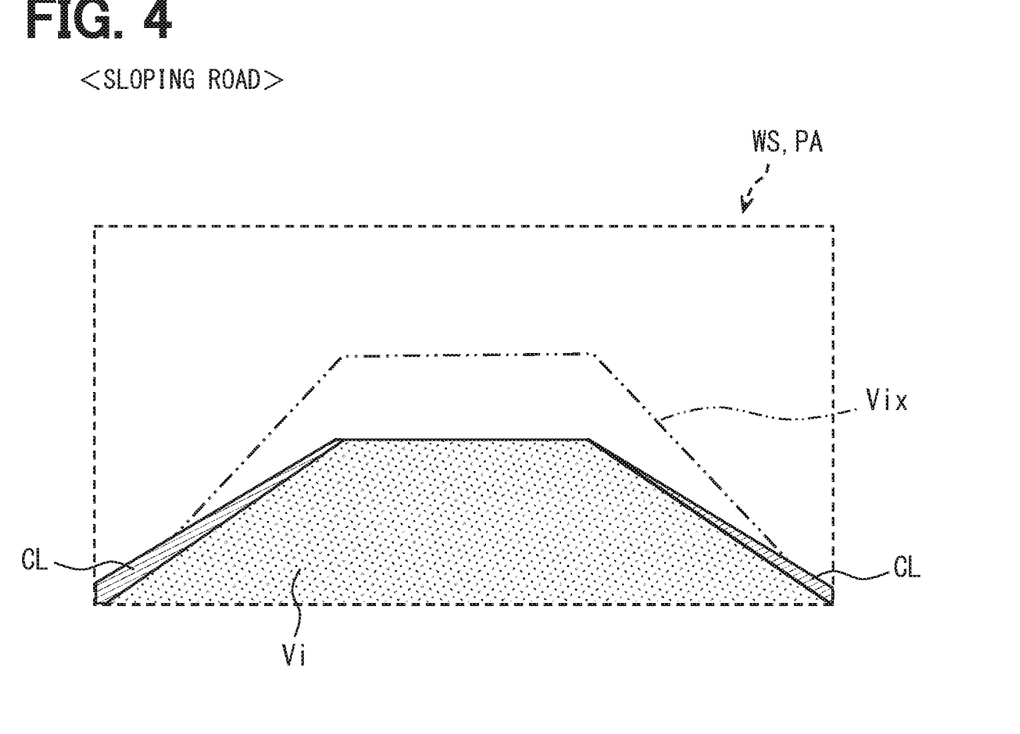
FIG. 4 is a diagram illustrating an example of AR display visually recognized by the driver on a sloping road.

In the memory device 63, various programs to be executed by the processor 61 are stored. The plurality of programs stored in the memory device 63 include a display control program controlling display of the virtual image Vi. As illustrated in FIGS. 3 and 4, the display control program realizes augmented reality (hereinbelow "AR") in which a virtual image Vi is superimposed on an superimposition object in the foreground. As an example, the display control program displays the virtual image Vi indicating the range of traffic lanes during travel so as to be superimposed between right and left compartment lines CL in the foreground.

Figure 5:
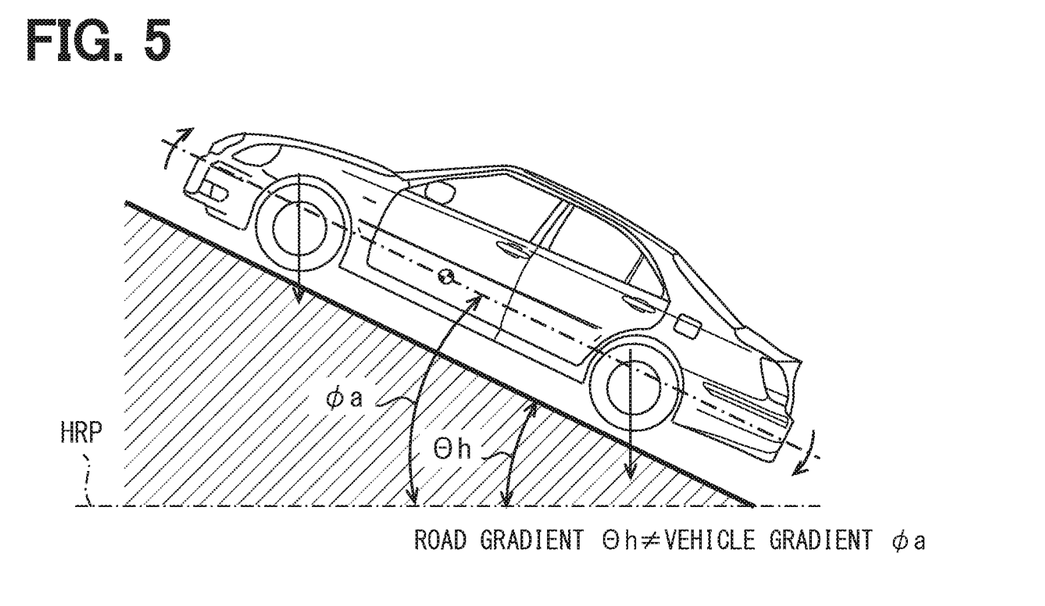
FIG. 5 is a diagram illustrating a state of a vehicle on a sloping road and the relation between road gradient and vehicle gradient.

The shape of a road surface visually recognized by the driver through the projection area PA in the case where a vehicle travels on a flat road and that in the case where a vehicle travels on a sloping road are different. As an example, when a vehicle is travelling on a flat road which is along the horizontal reference plane HRP and has no tilt, both a road gradient θh and a vehicle gradient φa are the same and substantially zero. On the other hand, when a vehicle travels on a sloping road inclined relative to the horizontal reference plane HRP (refer to FIG. 5), the vehicle gradient φa becomes a value different from the road gradient θh. Concretely, a value obtained by adding the pitch angle occurring in the vehicle to the road gradient θh becomes the vehicle gradient φa. The horizontal reference plane HRP is a virtual plane perpendicular to the direction of gravity.

By the above, in the case where correction of a projection position and a projection shape of a display light image on a sloping road is not executed, it is feared that a virtual image Vix (refer to FIG. 4) deviated from a superimposition object is displayed. To properly control the projection position and the projection shape of a display light image in accordance with the road gradient θh, an orientation change of the vehicle, and the like, the display control program computes the road gradient θh, a pitch angle and a roll angle occurring in the vehicle, a vehicle gradient φa relative to the horizontal reference plane HRP, and the like.

The display control device 100 illustrated in FIG. 1 has function blocks such as an information processing unit 71, a gradient calculation unit 72, a roll angle computation unit 74, a state estimation unit 75, an orientation detection unit 76, and a display control unit 77 by execution of the display control program.

The information processing unit 71 obtains an output value of the vehicle height sensor 40 as measurement information indicating a relative distance between the sub frame SF and the lower arm LA (refer to FIG. 2). In addition, the information processing unit 71 detects a no-load state in which a load causing a displacement in the vertical direction in a vehicle does not work on the basis of state information obtained from the state estimation unit 75. The information processing unit 71 sets an output value of the vehicle height sensor 40 in the no-load state as an initial value (reference value $V_0$) of the vehicle height sensor 40 indicating the state where the pitch angle and the roll angle are zero.

The gradient calculation unit 72 obtains vehicle speed information on the basis of a signal indicating rotational speed input from the vehicle speed sensor 24. The gradient calculation unit 72 specifies the present position of the vehicle by using vehicle speed information, position information of the vehicle obtained from the self-vehicle position detection device 21, and three-dimensional map data obtained from the three-dimensional map DB 22. Specifically, in the position information obtained from the self-vehicle position detection device 21, almost predetermined delay time (100 to 200 milliseconds) occurs. The gradient calculation unit 72 corrects a movement distance amount of the vehicle in the delay time with respect to the position information on the map on the basis of the vehicle speed information and specifies the present position of the vehicle.

Figure 6:
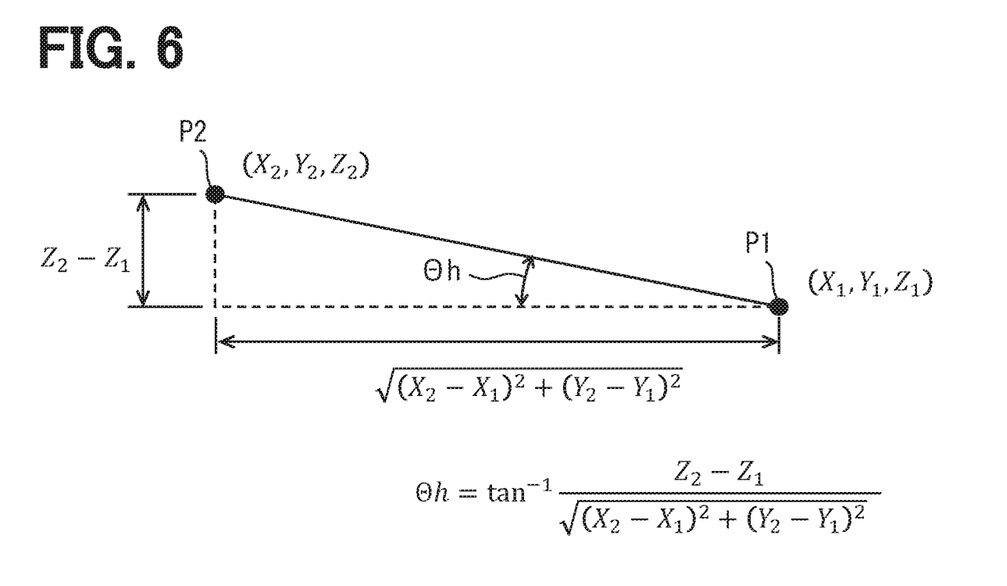
FIG. 6 is a diagram illustrating an example of a method of calculating road gradient from three-dimensional map data.

The gradient calculation unit 72 calculates the road gradient θh (refer to FIG. 5) of the road on which the vehicle travels by using the three-dimensional map data obtained from the three-dimensional map DB 22 on the basis of the specified present position of the vehicle. The road gradient θh is gradient information indicating a longitudinal gradient of a road, which is a positive value on an up-hill slope and a negative value on a down-hill slope. As an example, as illustrated in FIG. 6, the gradient calculation unit 72 specifies each of coordinates (refer to (X, Y, Z) of FIG. 6) indicating latitude, longitude, and altitude of two points P1 and P2 specifying a sloping road from information of a point group included in the three-dimensional map data. The gradient calculation unit 72 obtains the road gradient θh of the sloping road by geometric calculation using the coordinates of the two points P1 and P2.

The roll angle computation unit 74 obtains, as orientation information related to a roll angle ψ of a vehicle, vehicle speed information indicating travel speed v of the vehicle and curve information indicating curve radius r of a road on which the vehicle travels. The roll angle computation unit 74 obtains the vehicle speed information on the basis of a signal indicating rotational speed input from the vehicle speed sensor 24. In addition, the roll angle computation unit 74 calculates an actual steering angle A of steering wheels (front wheels) on the basis of signals indicating the rotation direction and the rotational angle input from the steering angle sensor 26, and estimates the curve radius r on the basis of the following mathematical expression. A constant W indicates length of the wheel base of the vehicle and is a value read from the memory device 63.

$$r = W/\sin A \qquad \text{Mathematical Expression 1}$$

The roll angle computation unit 74 calculates the roll angle ψ of the vehicle on the basis of the following mathematical expression using the travel speed v and the curve radius r as the orientation information. In the following expression, constants α and β are calibration values which are preliminarily set by examination, calculation, or the like, M denotes weight of the vehicle, g denotes gravitational acceleration, and θc denotes angle of a cant provided in a curve section. Each of the values of the constants α and β and the gravitational acceleration g are read from, for example, the memory device 63. On the other hand, the roll angle computation unit 74 obtains the value of the weight M estimated by the state estimation unit 75 and the cant angle θc computed or obtained by the gradient calculation unit 72 and uses them for calculation of the roll angle ψ. The roll angle computation unit 74 sequentially provides the value of the estimated roll angle ψ to the display control unit 77.

$$\psi = \alpha \left\{ \frac{Mv^2}{r} - Mg\sin\Theta_c \right\} + \beta \qquad \text{Mathematical Expression 2}$$

The state estimation unit 75 estimates the state of the vehicle on the basis of various information obtained from the vehicle speed sensor 24, the steering angle sensor 26, and the occupant sensor 27. The state estimation unit 75 obtains a detection result of an occupant by the occupant sensor 27 and estimates the weight of the vehicle on the basis of the number of occupants detected and seating positions. In estimation of the weight of the vehicle, the weight value of each of the occupants is substituted by a preliminarily designated average value. The state estimation unit 75 may estimate the position of the center of gravity of the vehicle.

The state estimation unit 75 obtains, in addition to the vehicle speed information and the steering information, brake pedal force information or the like indicating an operation to the brake pedal. By combining those pieces of information, the state estimation unit 75 determines whether or not it is a no-load state in which a load causing a displacement in the vertical direction does not act on the vehicle. In the case where both acceleration and brake force in the front-rear direction do not act, both the pitch angle and the roll angle become substantially zero. The state information indicating the no-load state of the vehicle is provided to the information processing unit 71 and used for setting of the reference value $V_0$. For determination of the no-load state, information of other in-vehicle sensors, for example, accelerator position information, acceleration information in the front-rear direction, and the like may be used.

Figure 8:
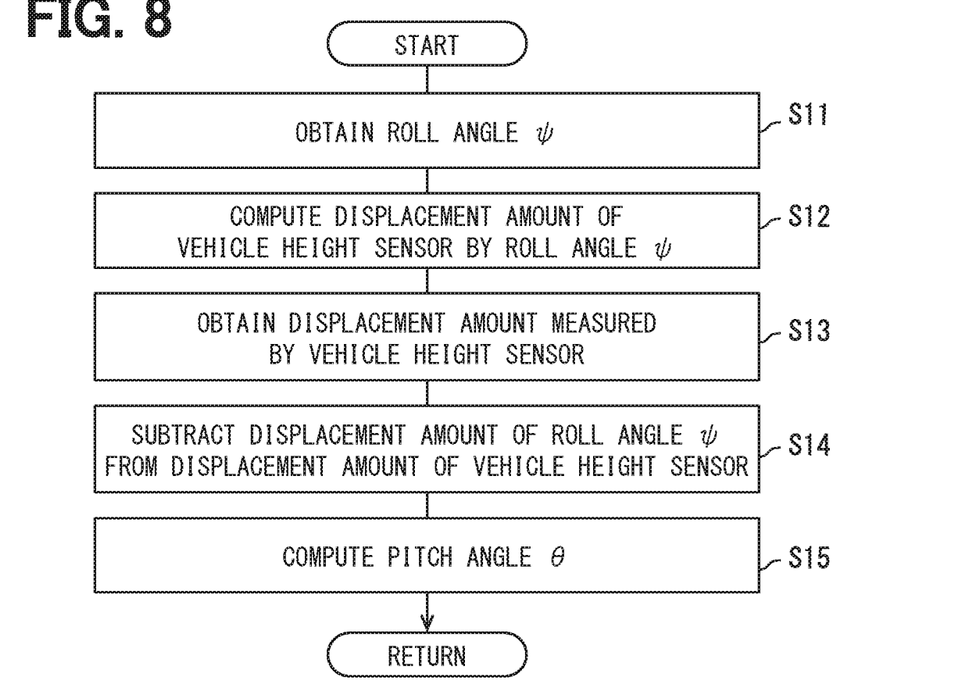
FIG. 8 is flowchart illustrating the details of a process of calculating a pitch angle from an output value of a vehicle height sensor.

The orientation detection unit 76 repeatedly executes a process of calculating the pitch angle θ of the vehicle on the basis of the output value of the vehicle height sensor 40 (refer to FIG. 8). The displacement amount in the vertical direction indicated by the output value of the vehicle height sensor 40 includes not only the displacement amount by the pitch angle but also the displacement amount by the roll angle. The orientation detection unit 76 removes the displacement amount (hereinbelow, "displacement amount $u_\psi$") in the vertical direction accompanying the rolling movement from the displacement amount measured by the vehicle height sensor 40 and computes the pitch angle θ.

Figure 7:
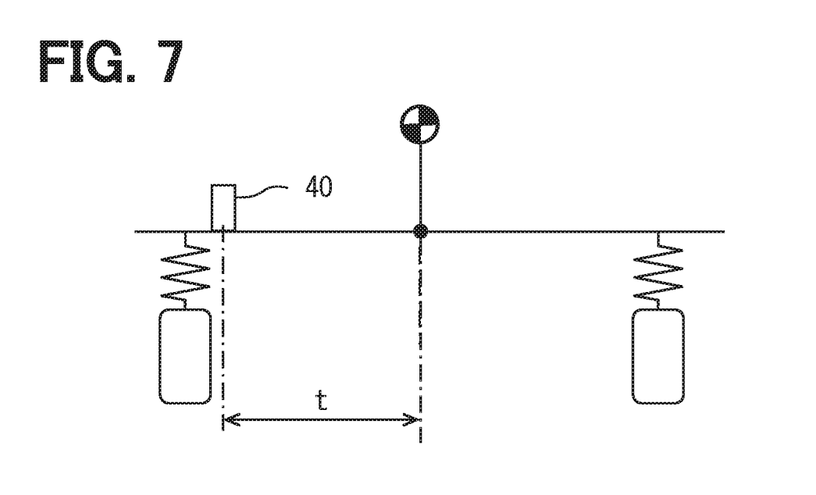
FIG. 7 is a diagram illustrating that the roll angle of a vehicle exerts an influence on measurement information of a vehicle height sensor.

First, the orientation detection unit 76 obtains the value of the roll angle ψ computed by the roll angle computation unit 74 (S11 in FIG. 8). The orientation detection unit 76 computes the displacement amount $u_\psi$ of the vehicle height sensor 40 by the roll angle ψ on the basis of the following mathematical expression using the obtained value of roll angle ψ (S12 in FIG. 8). The constant t in the following mathematical expression denotes a distance between the center in the width direction of the vehicle to the attachment position of the vehicle height sensor 40 (refer to FIG. 7) and is read from the memory device 63.

$$u_\psi = t \cdot \tan \psi \qquad \text{Mathematical Expression 3}$$

The orientation detection unit 76 obtains the displacement amount f(V) in the vertical direction measured by the vehicle height sensor 40 on the basis of the following mathematical expression using the output value V of the vehicle height sensor 40 provided from the information processing unit 71 and the reference value $V_0$ (S13 in FIG. 8). The constants a and b in the following mathematical expression are calibration values which are preliminarily set by examination, calculation, or the like and read from the memory device 63.

$$f(V) = a \cdot (V - V_0) + b \qquad \text{Mathematical Expression 4}$$

The orientation detection unit 76 subtracts the displacement amount $u_\psi$ accompanying the roll movement from the displacement amount f(V) of the vehicle height sensor 40 on the basis of the following mathematical expression (S14 in FIG. 8). By the above, the displacement amount (hereinbelow, "displacement amount $u_\theta$") in the vertical direction accompanying pitch movement is calculated.

$$u_\theta = f(V) - u_\psi \qquad \text{Mathematical Expression 5}$$

Further, the correlation between the pitch angle θ and the displacement amount $u_\theta$ is as expressed by the following mathematical expression. A constant Lr in the following mathematical expression is a distance from the position of the center of gravity in the front-rear direction of the vehicle to the rear axle. For the sake of convenience, the constant Lr may be the value (W/2) of the half of the wheel base or a horizontal distance from the pitch center of the vehicle to the rear axle. Those values are read from the memory device 63.

$$u_\theta = L_r \cdot \tan \theta \qquad \text{Mathematical Expression 6}$$

Figure 9:
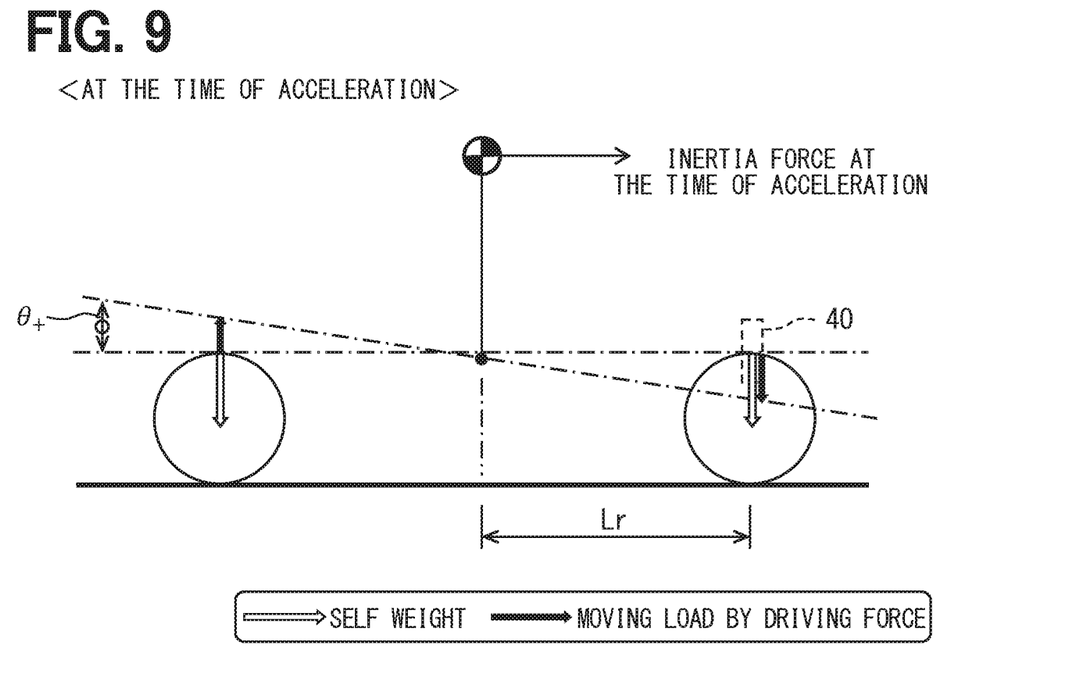
FIG. 9 is a diagram schematically illustrating the correlation between a displacement amount of the vehicle height sensor and the pitch angle at the time of acceleration.
Figure 10:
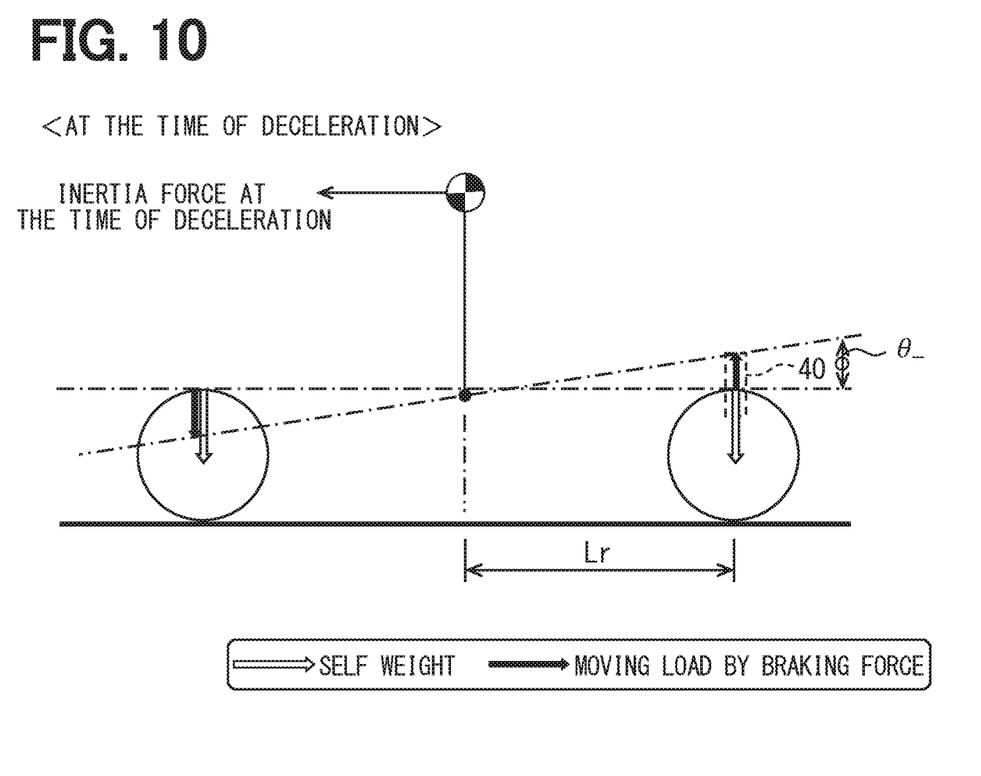
FIG. 10 is a diagram schematically illustrating the correlation between a displacement amount of the vehicle height sensor and the pitch angle at the time of deceleration.

A damper which damps the movement in the vertical direction of the wheel with respect to the body is set so that the damping force on the expansion side is larger than that on the contraction side. Therefore, as illustrated in FIG. 9, in the case where the inertia force acts on the rear side at the time of acceleration of the vehicle, the displacement amount $u_\theta$ of a suspension device on the rear side making sinking motion becomes larger than that of a suspension device on the front side making floating motion. On the other hand, as illustrated in FIG. 10, in the case where the inertia force acts on the front side at the time of deceleration of the vehicle, the displacement amount $u_θ$ of the suspension device on the rear side making floating motion becomes smaller than that of that suspension device on the front side making sinking motion.

As described above, the pitch angle $θ_+$ corresponding to the unit displacement amount occurring in the vertical direction at the time of acceleration of the vehicle is different from the pitch angle $θ_-$ corresponding to the unit displacement amount at the time of deceleration. In the case where the vehicle height sensor 40 is mounted in the rear part of the vehicle, the pitch angle $θ_+$ corresponding to the unit displacement amount at the time of acceleration is smaller than the pitch angle $θ_-$ corresponding to the unit displacement amount at the time of deceleration. In other words, even when the absolute values of the pitch angles $θ_+$ and $θ_-$ of a vehicle are the same, the displacement amount $u_θ$ measured at the time of acceleration becomes larger than the displacement amount $u_θ$ measured at the time of deceleration.

By modifying the above mathematical expression (6), the following mathematical expressions of calculating the pitch angle $θ$ from the displacement amount $u_θ$ at each of the time of acceleration and the time of deceleration are obtained. The constants $c_+$, $c_-$, $d_+$, and $d_-$ in the following mathematical expressions are calibration values which are preliminarily set by examination, calculation, or the like. The constant $c_+$ at the time of acceleration is set to a value smaller than the constant $c_-$ at the time of deceleration ($c_+ < c_-$). The orientation detection unit 76 calculates the pitch angle $θ$ at the time of acceleration and at the time of deceleration on the basis of the following mathematical expressions (S15 in FIG. 8).

$$\begin{cases} θ_+ = c_+ \cdot \tan^{-1}\left(\dfrac{u_θ}{L_r}\right) + d_+ \\ θ_- = c_- \cdot \tan^{-1}\left(\dfrac{u_θ}{L_r}\right) + d_- \end{cases} \quad \text{Mathematical Expression 7}$$

The display control unit 77 generates video image data of a display light image projected by the projector 11 and sequentially outputs it toward the optical unit 10. In the optical unit 10, light of the display light image based on the video image data is projected to the projection area PA and formed as the virtual image Vi. At the time of generating video image data, the display control unit 77 repeatedly executes a process of correcting a drawing position and a drawing shape of an original image which becomes the virtual image Vi in accordance with the road gradient and the vehicle orientation in each of frames constructing the video image data (refer to FIG. 11).

Figure 11:
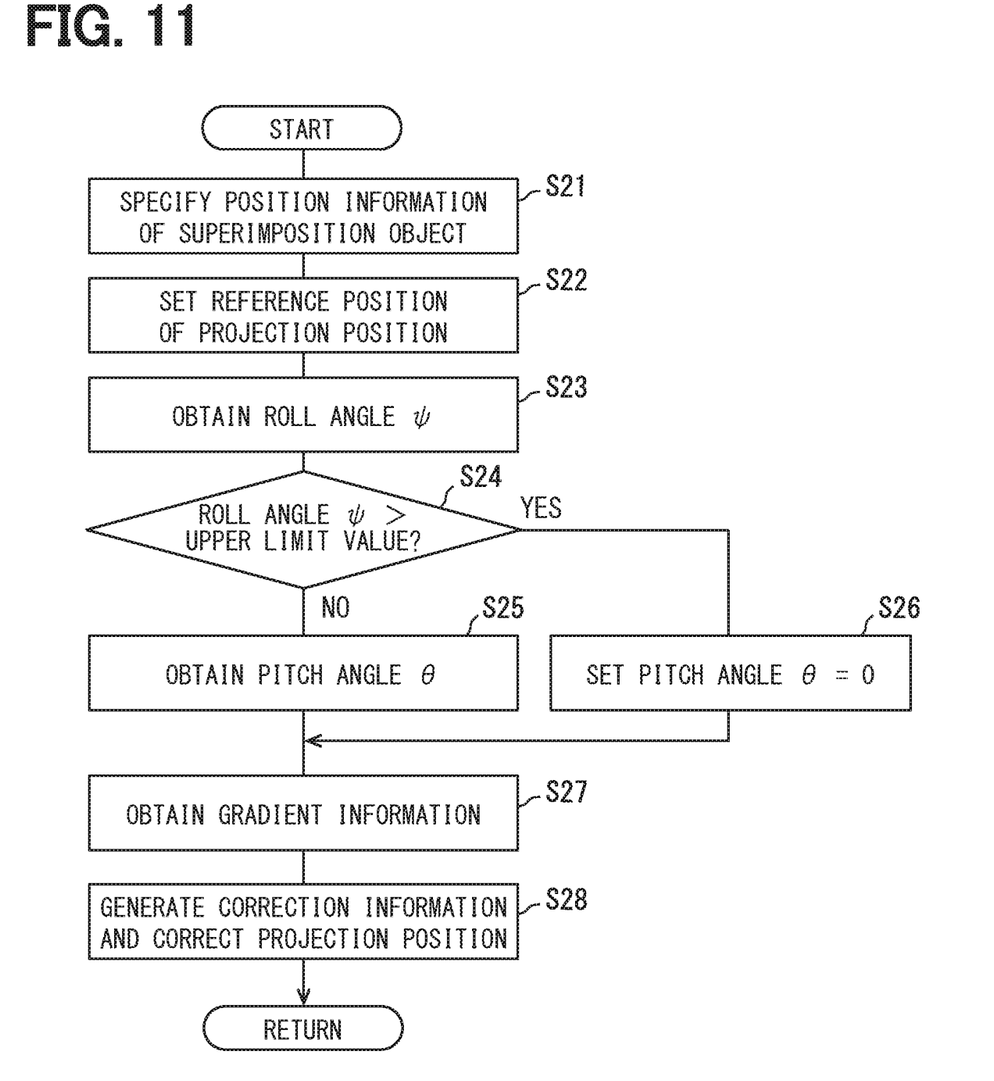
FIG. 11 is a flowchart illustrating the details of a process of correcting a projection position of a display light image in accordance with road gradient and vehicle orientation.

Specifically, the display control unit 77 specifies a relative position of a superimposition object on which the virtual image Vi is superimposed on the basis of three-dimensional map data, recognition information of an external sensor such as a camera mounted in the vehicle, and the like (S21 in FIG. 11). The display control unit 77 sets a projection position to which the light of the display light image is projected in the projection area PA by geometric computation on the basis of the relations of the relative position of the superimposition object obtained and the positions of the eyellipse of the driver and the projection area PA which are preliminarily defined (S22 in FIG. 11). The display control unit 77 sets, as a reference position, the projection position of the display light image in the case where the road gradient $θh$ (refer to FIG. 5) is substantially zero and both a roll and a pitch do not occur.

In addition, the display control unit 77 obtains the value of the roll angle $ψ$ computed by the roll angle computation unit 74 (S23 in FIG. 11). The display control unit 77 determines whether or not the value of the roll angle $ψ$ obtained exceeds a preset upper limit value (S24 in FIG. 11). When the roll angle $ψ$ is equal to or less than the upper limit value, the display control unit 77 obtains the value of the latest pitch angle $θ$ computed in the orientation detection unit 76.

The display control unit 77 calculates the vehicle gradient $φa$ (refer to FIG. 5) by using the pitch angle $θ$ of the vehicle and the gradient information obtained from the gradient calculation unit 72. In addition, the display control unit 77 calculates a deviation amount in the vertical direction of the projection area PA accompanying the roll movement by using the roll angle $ψ$. The display control unit 77 performs computation of correcting the projection position using the vehicle gradient $φa$ and the deviation amount in the vertical direction of the projection area PA as correction information (S27 in FIG. 11). The display control unit 77 sets a drawing position of an original image in each of the frames so that the display light image is projected in the corrected projection position.

On the other hand, in the case where the roll angle $ψ$ of the vehicle exceeds the upper limit value, the display control unit 77 forcedly sets the pitch angle $θ$ to zero (S24 in FIG. 11). By the above, the correction of the projection position is stopped. The upper limit value is, as an example, designated on the basis of a display view angle $θv$ in the longitudinal direction of the virtual image Vi seen from the driver. When the roll angle $ψ$ increases, the superimposition object seen from the driver deviates from the range in which the virtual image Vi can be superimposed. Concretely, a movement amount in the vertical direction in the projection area PA is a product between a horizontal distance in the width direction from the center in the width direction of the vehicle to the projection area PA and the roll angle $ψ$. On the other hand, the dimension in the vertical direction of the projection range in which the display light image is projected is a product between the distance from the center of the eyellipse to the projection area PA and the display view angle $θv$. Therefore, in the case where the movement amount in the vertical direction of the projection area PA according to a roll exceeds the dimension in the vertical direction of the projection range, even if the projection position is corrected, the virtual image Vi is not superimposed on the superimposition object. Consequently, by using the upper limit value calculated geometrically from the display view angle $θv$, the display control unit 77 can properly stop the correction of the projection position at a timing reaching an uncorrectable state and switch to projection to the reference position.

In the embodiment described above, the projection position of the display light image is corrected by gradient information based on three-dimensional map data and the measurement information measured by one vehicle height sensor 40. Consequently, a plurality of sensors or complicated configuration for measuring the orientation of a vehicle can be unnecessary. Therefore, while avoiding complication of the configuration of detecting the vehicle orientation, a deviation of virtual image display from a superimposition object can be decreased.

The displacement in the vertical direction of the vehicle includes a displacement amount caused by pitch movement and a displacement amount caused by roll movement. Therefore, in the embodiment, the displacement amount $u_\psi$ by the roll angle is subtracted from the entire displacement amount based on the output value of the vehicle height sensor 40. By the above, also in the mode of grasping the vehicle orientation by a single vehicle height sensor 40, the projection position can be properly corrected in accordance with the pitch angle θ of the vehicle. Consequently, also during travel on a curve where roll occurs, the virtual image Vi is continuously superimposed on a superimposition object with high precision.

On the other hand, depending on increase in the roll angle ψ, a case that the projection position lies out of the range in which the projection position can be corrected is assumed. Consequently, in the embodiment, when the roll angle ψ of the vehicle exceeds the upper limit value, correction of the projection position is stopped. It avoids a situation that the behavior of the virtual image Vi which is forcedly tried to be superimposed on the superimposition object makes the driver feel bothered.

In the embodiment, the roll angle ψ is estimated on the basis of the vehicle speed information and curve information. Those values can be obtained by using the vehicle speed sensor 24 and the steering angle sensor 26 which are generally mounted in a vehicle. Therefore, also in the mode of correcting the projection position in consideration of the roll angle ψ, complication of the configuration of detecting the vehicle orientation can be avoided.

Further, in the embodiment, the upper limit value of the roll angle at which the correction of the projection position is stopped is designated on the basis of the display view angle θv in the longitudinal direction of the virtual image Vi. The larger the display view angle θv becomes, the larger the adjustment margin of adjusting the projection position of the display light image in the vertical direction can be assured. Therefore, when the upper limit value used to determine stop of the correction is designated on the basis of the display view angle θv, while effectively using the performance of the optical unit, correction stop can be determined at a proper roll angle ψ.

In addition, in the embodiment, in the process of calculating the pitch angle θ from the displacement amount $u_\theta$, the pitch angle $\theta_+$ corresponding to the unit displacement amount at the time of acceleration is different from the pitch angle $\theta_-$ corresponding to the unit displacement amount at the time of deceleration. As described above, by the process of switching the mathematical expression applied in consideration of the characteristic of the orientation change of the vehicle, even in a mode of detecting an orientation change only by a single vehicle height sensor 40, the display control device 100 can calculate the proper pitch angle θ from the measured displacement amount $u_\theta$.

Concretely, in the embodiment, the vehicle height sensor 40 is attached to the rear part of the vehicle. In such a mode, by setting the pitch angle $\theta_+$ corresponding to the unit displacement amount at the time of acceleration to be smaller than the pitch angle $\theta_-$ corresponding to the unit displacement amount at the time of deceleration, the display control device 100 can calculate the pitch angle θ from the displacement amount $u_\theta$ with high precision.

Further, in the embodiment, using an output value in the no-load state as a reference, the initial value of the vehicle height measurement sensor is set. By such a setting, even in the case where a change occurs in the number of occupants and load, a change in the pitch angle θ according to an orientation change during travel can be calculated with high precision from a change in the output value of the vehicle height sensor 40.

In the embodiment, the information processing unit 71 corresponds to a "measurement information obtaining unit", the gradient calculation unit 72 corresponds to a "gradient information obtaining unit", the roll angle computation unit 74 corresponds to an "orientation information obtaining unit", and the orientation detection unit 76 and the display control unit 77 correspond in cooperation to a "position setting unit".

OTHER EMBODIMENTS

Although an embodiment of the present disclosure has been described above, the present disclosure is not interpreted by being limited to the foregoing embodiment but can be applied to various embodiments and combinations in a range which does not depart from the gist of the present disclosure.

In the embodiment, the displacement amount by the roll angle is subtracted from the entire displacement amount measured by the vehicle height sensor. However, in a first modification of the embodiment, the process of correcting the roll angle is omitted. In an orientation detection unit of the first modification, the pitch angles $\theta_+$ and $\theta_-$ are calculated from the output value V of the vehicle height sensor on the basis of the following mathematical expressions. The mathematical expression for calculating the pitch angle $\theta_+$ is applied in the case of $V-V_0>0$, and the mathematical expression for calculating the pitch angle $\theta_-$ is applied in the case of $V-V_0<0$.

$$\begin{cases} \theta_+ = a_+(V-V_0) + b_+ \\ \theta_- = a_-(V-V_0) + b_- \end{cases} \quad \text{Mathematical Expression 8}$$

The constants $a_+$, $a_-$, $b_+$, and $b_-$ in the above mathematical expressions are calibration values which are preliminarily set by examination, calculation, or the like and read from a memory device. When the vehicle height sensor is provided in the rear suspension, the relation of $a_+<a_-$ is satisfied. By the above, the pitch angle corresponding to the unit displacement amount at the time of acceleration becomes smaller than the pitch angle corresponding to the unit displacement amount at the time of deceleration. When the vehicle height sensor is provided in the front suspension, the relation of $a_+>a_-$ (in Mathematical Expression 7, "$c_+>c_-$") is satisfied.

In the foregoing embodiment, the curve radius for calculating the roll angle is calculated on the basis of each of the values of an actual steering angle and a wheel base. However, in a mode in which a yaw rate sensor is mounted in a vehicle, the curve radius may be calculated on the basis of an output value (yaw angle) of the yaw rate sensor. Alternatively, the curve radius may be extracted from three-dimensional map data.

In the foregoing embodiment, at the time point the roll angle exceeds the upper limit value, correction of a projection position is interrupted. At this time, the projection position of a display light image may not be returned to the reference position. The optical unit may continue projection of a display light image in a state where the projection position is moved maximally. The correction of the projection position accompanying increase in the roll angle may not be stopped. Further, the upper limit value as a threshold of correction stop may be properly changed.

In the foregoing embodiment, in the process of calculating the pitch angle from the displacement amount, the mathematical expression used at the time of acceleration and that used at the time of deceleration are different from each other. However, a common mathematical expression may be used at the time of acceleration and at the time of deceleration. Further, in the case where a vehicle height sensor is mounted in the front part of a vehicle, the pitch angle corresponding to a unit displacement amount at the time of acceleration may be larger than the pitch angle corresponding to a unit displacement amount at the time of deceleration.

In the foregoing embodiment, by the process of correcting an original image in each of frames of video image data, display in which the virtual image Vi is superimposed on a superimposition object is maintained. However, when an adjustment mechanism of adjusting the orientation of a reflective optical system is provided in an optical unit, by mechanical control of operating the adjustment mechanism on the basis of correction information, a superimposition state of the virtual image Vi may be maintained.

The process for the display control described above may be executed by a configuration different from that of the display control device. For example, the display control device may have a configuration included in a combination meter, a navigation device, or the like. That is, a combination meter and a navigation device may obtain the function of the display control device by executing the above-described display control program by a control circuit. Further, computation for orientation detection executed by the orientation detection unit in the foregoing embodiment may be dispersedly performed by control circuits of a plurality of control devices mounted in a vehicle.

Further, various non-transitory tangible storage media such as a flash memory and a hard disk can be employed in the memory device as a configuration of storing a display control program. In addition, a storage medium storing the display control program is not limited to the storage medium provided for the electronic control unit mounted in a vehicle but may be an optical disk, a hard disk drive of a general computer, or the like as a copy source to the storage medium.

It is noted that a flowchart or the processing of the flowchart in the present disclosure includes sections (also referred to as steps), each of which is represented, for instance, as S101. Further, each section can be divided into several sub-sections while several sections can be combined into a single section. Furthermore, each of thus configured sections can be also referred to as a circuit, device, module, or means.

Each or any combination of sections explained in the above can be achieved as (i) a software section in combination with a hardware unit (e.g., computer) or (ii) a hardware section, including or not including a function of a related apparatus; furthermore, the hardware section (e.g., integrated circuit, hard-wired logic circuit) may be constructed inside of a microcomputer.

What is claimed is:

1. A display control device for controlling display of a virtual image which is superimposed on foreground of a vehicle by projection of a display light image from an optical unit to a projection area, comprising:
   a position setting unit that sets a projection position of the display light image, which is projected in the projection area, on the basis of a relative position of a superimposition object on which the virtual image is superimposed;
   a measurement information obtaining unit that obtains a measurement information from one vehicle height sensor measuring a displacement in a vertical direction occurring in the vehicle;
   a gradient information obtaining unit that obtains a gradient information indicating a gradient of a road on which the vehicle travels on the basis of three-dimensional map data; and
   an orientation information obtaining unit that obtains orientation information including vehicle speed information indicating a travel speed of the vehicle and curve information indicating a curve radius of the road on which the vehicle travels and that estimates a roll angle of the vehicle based on the vehicle speed information and the curve information;
   wherein the position setting unit corrects the projection position of the display light image on the basis of the measurement information and the gradient information and stops correction of the projection position in response to the estimated roll angle exceeding a preliminarily designated upper limit value.

2. The display control device according to claim 1, wherein
   the position setting unit corrects a displacement amount in the vertical direction according to a roll movement of the vehicle included in the measurement information by using the orientation information.

3. The display control device according to claim 1, wherein
   the upper limit value is designated on the basis of a display view angle in the vertical direction of the virtual image in the optical unit.

4. The display control device according to claim 1, wherein
   the position setting unit calculates a pitch angle of the vehicle on the basis of a displacement amount in the vertical direction indicated by the measurement information, and
   a pitch angle corresponding to a unit displacement amount occurring in the vertical direction at the time of acceleration of the vehicle is different from a pitch angle corresponding to the unit displacement amount at the time of deceleration.

5. The display control device according to claim 4, wherein
   the vehicle height sensor measures the displacement in the vertical direction at a part rearward of the center in the front-rear direction of the vehicle, and
   a pitch angle corresponding to the unit displacement amount at the time of acceleration is smaller than a pitch angle corresponding to the unit displacement amount at the time of deceleration.

6. The display control device according to claim 1, wherein
   the measurement information obtaining unit sets an output value of the vehicle height sensor in a no-load state where a load causing the displacement in the vertical direction in the vehicle does not act as a reference value of the vehicle height sensor.

7. A non-transitory computer readable medium storing a computer program product comprising instructions for controlling display of a virtual image which is superimposed on foreground of a vehicle by projection of a display light image from an optical unit to a projection area, the instructions being configured to, when executed by a processor, cause the processor to:

set a projection position of the display light image, which is projected in the projection area, on the basis of a relative position of a superimposition object on which the virtual image is superimposed;

obtain a measurement information from one vehicle height sensor measuring a displacement in a vertical direction occurring in the vehicle;

obtain a gradient information indicating a gradient of a road on which the vehicle travels on the basis of three-dimensional map data;

correct the projection position of the display light image on the basis of the measurement information and the gradient information;

obtain vehicle speed information indicating a travel speed of the vehicle and curve information indicating a curve radius of the road on which the vehicle travels;

estimate a roll angle of the vehicle based on the vehicle speed information and the curve information; and stop correction of the projection position in response to the estimated roll angle exceeding a preliminarily designated upper limit value.

8. A display control device for controlling display of a virtual image which is superimposed on foreground of a vehicle by projection of a display light image from an optical unit to a projection area, comprising a processor configured to:

set a projection position of the display light image, which is projected in the projection area, on the basis of a relative position of a superimposition object on which the virtual image is superimposed;

obtain measurement information from one vehicle height sensor measuring a displacement in a vertical direction occurring in the vehicle;

obtain gradient information indicating a gradient of a road on which the vehicle travels on the basis of three-dimensional map data;

correct the projection position of the display light image on the basis of the measurement information and the gradient information;

obtain vehicle speed information indicating a travel speed of the vehicle and curve information indicating a curve radius of the road on which the vehicle travels;

estimate a roll angle of the vehicle based on the vehicle speed information and the curve information; and stop correction of the projection position in response to the estimated roll angle exceeding a preliminarily designated upper limit value.

* * * * *